(12) United States Patent
Ozaki et al.

(10) Patent No.: US 12,288,475 B2
(45) Date of Patent: Apr. 29, 2025

(54) PROCEDURE SIMULATOR AND PROCEDURE TRAINING METHOD USING THE SAME

(71) Applicant: TERUMO KABUSHIKI KAISHA, Tokyo (JP)

(72) Inventors: Kouji Ozaki, Kanagawa (JP); Daiki Nozawa, Choufu (JP); Junichi Fukamizu, Yokohama (JP); Makoto Takahashi, Hadano (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 473 days.

(21) Appl. No.: 17/816,479

(22) Filed: Aug. 1, 2022

(65) Prior Publication Data
US 2022/0392374 A1    Dec. 8, 2022

Related U.S. Application Data

(63) Continuation of application No. PCT/JP2021/000614, filed on Jan. 12, 2021.

(30) Foreign Application Priority Data

Feb. 4, 2020    (JP) .................... 2020-017102

(51) Int. Cl.
*G09B 23/30*    (2006.01)
*G09B 23/28*    (2006.01)

(52) U.S. Cl.
CPC ......... *G09B 23/285* (2013.01); *G09B 23/286* (2013.01)

(58) Field of Classification Search
CPC ....... G09B 23/28; G09B 23/30; G09B 23/303
See application file for complete search history.

(56) References Cited

U.S. PATENT DOCUMENTS 5,494,822 A * 2/1996 Sadri ................. A01N 1/02
                                                   417/42
5,634,797 A * 6/1997 Montgomery ......... G09B 23/30
                                                   434/272

(Continued)

FOREIGN PATENT DOCUMENTS

AU     2006203753 A1    3/2007
CN       106463067 A    2/2017
(Continued)

OTHER PUBLICATIONS

International Search Report (PCT/ISA/210) with English translation and Written Opinion (PCT/ISA/237) mailed on Mar. 30, 2021, by the Japanese Patent Office as the International Searching Authority for International Application No. PCT/JP2021/000614.

(Continued)

*Primary Examiner* — Kurt Fernstrom
(74) *Attorney, Agent, or Firm* — Buchanan Ingersoll & Rooney PC

(57) ABSTRACT

A procedure simulator is provided, which includes a first storage tank configured to store a liquid imitating blood; a tissue model including a plurality of bifurcated flow paths being bifurcated downstream via a plurality of bifurcated portions; a pump configured to supply the liquid to the tissue model; a second storage tank configured to store the liquid to be flowed out from the plurality of bifurcated flow paths; a plurality of pipes configured to connect an outlet of a bifurcated flow path to the second storage tank; a plurality of switching valves configured to selectively causing the bifurcated flow path to communicate with a drain flow path from which the liquid is discharged below the tissue model; and a filter member between the switching valve and the outlet of the bifurcated flow path of the plurality of bifurcated flow paths.

18 Claims, 9 Drawing Sheets

(56) References Cited

U.S. PATENT DOCUMENTS

| | | | |
|---|---|---|---|
| 9,844,383 B2 | 12/2017 | Allen | |
| 9,852,660 B1 | 12/2017 | Fairbanks | |
| 9,965,591 B2 * | 5/2018 | Christiansen | G16H 50/00 |
| 10,885,813 B2 * | 1/2021 | Krummenacher | G09B 23/30 |
| 11,176,849 B2 * | 11/2021 | Fatimi | G09B 23/303 |
| 11,238,755 B2 * | 2/2022 | Fiore | G09B 23/303 |
| 11,348,481 B2 * | 5/2022 | Nelson | G09B 23/303 |
| 11,417,242 B2 * | 8/2022 | Takahashi | G09B 23/285 |
| 11,576,371 B2 * | 2/2023 | Legallais | A01N 1/0247 |
| 11,682,320 B2 * | 6/2023 | Sadasivan | G16H 50/20 434/268 |
| 2009/0226867 A1 | 9/2009 | Kalafut et al. | |
| 2014/0322688 A1 * | 10/2014 | Park | G09B 23/288 434/268 |
| 2014/0370490 A1 * | 12/2014 | Iaizzo | A01N 1/0247 435/1.2 |
| 2015/0161347 A1 | 6/2015 | Christiansen et al. | |
| 2017/0103682 A1 | 4/2017 | Okayama et al. | |
| 2018/0374390 A1 | 12/2018 | Lindkvist | |
| 2021/0020071 A1 | 1/2021 | Takahashi et al. | |

FOREIGN PATENT DOCUMENTS

| | | |
|---|---|---|
| CN | 206194241 U | 5/2017 |
| EP | 0 825 582 A1 | 2/1998 |
| EP | 2 772 897 A1 | 9/2014 |
| JP | 2016057451 A | 4/2016 |
| JP | 2017140334 A | 8/2017 |
| WO | 2016075732 A1 | 5/2016 |
| WO | 2017/190732 A1 | 11/2017 |
| WO | 2019005868 A1 | 1/2019 |
| WO | 2020031474 A1 | 2/2020 |

OTHER PUBLICATIONS

Irie et al., "Dense Accumulation of Lipiodol Emulsion in Hepatocellular Carcinoma Nodule during Selective Balloon-occluded Arterial Stump Pressure", Cardio Vascular and Intervention Radiology, 2013, No. 36, pp. 706-713.

Matsumoto et al., "Balloon-occluded arterial stump pressure before balloon-occluded transarterial chemoembolization", Minimally Invasive Therapy & Allied Technologies, vol. 25, 2016 Issue 1, and published Online on Sep. 25, 2015, the Internet URL:https://doi.org/10.3109/13645706.2015.1086381, 8 pages.

Aramburu et al., Numerical Zero-Dimensional Hepatic Artery Hemodynamics Model for Balloon-Occluded Transarterial Chemoembolization, International Journal for Numerical Methods in Biomedical Engineering, (Apr. 16, 2018), vol. 34, No. 7, pp. 1-15.

Aramburu et al., "In Vitro Model for Simulating Drug Delivery During Balloon-Occluded Transarterial Chemoembolization", Biology, (Dec. 16, 2021), vol. 10, No. 12, p. 1341, (19 pages).

The extended European Search Report issued May 25, 2023, by the European Patent Office in corresponding European Patent Application No. 21750616.1-1218. (10 pages).

Office Action (The First Office Action) issued Jun. 3, 2023, by the National Intellectual Property Administration, P. R. China in corresponding Chinese Patent Application No. 202180005945.0 and an English translation of the Office Action. (10 pages).

English Translations of the International Search Report (Form PCT/ISA/210) and the Written Opinion of the International Searching Authority (Form PCT/ISA/237) issued Mar. 30, 2021, by the Japan Patent Office in corresponding International Application No. PCT/JP2021/000614. (7 pages).

\* cited by examiner

PROCEDURE SIMULATOR AND PROCEDURE TRAINING METHOD USING THE SAME

CROSS-REFERENCES TO RELATED APPLICATIONS

This application is a continuation of International Application No. PCT/JP2021/000614 filed on Jan. 12, 2021, which claims priority to Japanese Application No. 2020-017102 filed on Feb. 4, 2020, the entire content of both of which is incorporated herein by reference.

TECHNOLOGICAL FIELD

This disclosure relates to a procedure simulator that is used for training of a procedure using a catheter, and a procedure training method using the same.

BACKGROUND DISCUSSION

Procedures in which a diagnostic agent such as a contrast medium or a therapeutic agent such as an anticancer agent or an embolization material is administered through a catheter inserted into an artery to conduct a diagnosis and a treatment, with respect to liver cancer, prostatehyperplasia, uterine fibroid, and the like have been known. In the treatment, it is desirable to selectively administer the therapeutic agent to a tissue of the cancer, the tumor, or the like, and prevent the therapeutic agent from flowing into a normal tissue as much as possible.

In recent years, a procedure such as balloon occluded trans arterial chemo embolization (B-TACE) in which attention is focused on the concentration of arterial flows because minute artery blood vessels are formed in the cancer tissue is disclosed, for example, in U.S. Pat. No. 9,844,383; Irie et al., "Dense Accumulation of Lipiodol Emulsion in Hepatocellular Carcinoma Nodule during Selective Balloon-occluded Arterial Stump Pressure", Cardio Vascular and Intervention Radiology, 2013, No. 36, p. 706-713; and Matsumoto et al., "Balloon-occluded arterial stump pressure before balloon-occluded transarterial chemoembolization", Minimally Invasive Therapy & Allied Technologies, Volume 25, 2016 Issue 1, Sep. 25, 2015, the Internet <URL:https://doi.org/10.3109/13645706.2015.1086381>.

B-TACE is a percutaneous treatment procedure in which an artery upstream of a cancer tissue where arterial flows are concentrated is occluded with a balloon of a catheter distal end portion, whereby a local difference (also called pressure difference) in blood pressure between a normal tissue and the tissue of a cancer, a tumor, or the like is be generated. B-TACE is characterized in that a therapeutic agent is administered from a distal end side of the balloon inserted into the blood vessel and caused to inflate, whereby the therapeutic agent is specifically concentrated to a treatment site.

However, it is difficult for a doctor who is familiar with the conventional treatment to intuitively understand the blood flow that is generated locally in the living body and under a limited condition, and the fact is that it is difficult to say that these procedures are widely used in medical practice.

SUMMARY

Therefore, there is a demand for a procedure simulator and a procedure training method using the same with which it is possible to actually realize that a therapeutic agent can be selectively administered to a specific region due to a pressure difference that is generated by occluding an inside of a blood vessel with a balloon.

One aspect of the disclosure below is a procedure simulator including: a first storage tank configured to store a liquid; a tissue model including a plurality of bifurcated flow paths being bifurcated downstream via a plurality of bifurcated portions, the bifurcated portions and the bifurcated flow paths being formed at a same height; a pump configured to supply the liquid in the first storage tank to the tissue model; a second storage tank configured to store the liquid to be flowed out from the bifurcated flow paths; a plurality of pipe configured to connects an outlet of the bifurcated flow path to the second storage tank; a plurality of switching valves configured to selectively causes the bifurcated flow path to communicate with a drain flow path from which the liquid is discharged below the second storage tank; and a plurality of filters, each of the plurality of filters located between one of the plurality of switching valves and the corresponding outlet of the plurality of bifurcated flow paths.

Another aspect includes a procedure simulator comprising: a tissue model including a plurality of bifurcated flow paths; a first storage tank configured to store a liquid; a second storage tank configured to store the liquid from the bifurcated flow paths; a third storage tank configured to contain the liquid to be discharged from a drain flow path, wherein a liquid surface of the third storage tank is present at a position lower than the tissue model; a pump configured to supply the liquid in the first storage tank to the tissue model; a plurality of pipes, each of the plurality of pipes configured to connect an outlet of one of the plurality of bifurcated flow paths to the second storage tank; a plurality of switching valves, each of the plurality of switching valves configured to selectively cause one of the plurality of bifurcated flow paths to communicate with the drain flow path from which the liquid is discharged below the second storage tank; and a plurality of filters, each of the plurality of filters located between one of the plurality of switching valves and a corresponding outlet of one of the plurality of bifurcated flow paths A further aspect is a training method that uses a procedure simulator, the training method includes: filling a first storage tank of the procedure simulator with a liquid, the procedure simulator including the first storage tank, a tissue model including a plurality of bifurcated flow paths bifurcated downstream via a plurality of bifurcated portions, the plurality of bifurcated portions and the plurality of bifurcated flow paths being at a same height, a pump to supply the liquid in the first storage tank to the tissue model, a second storage tank to store the liquid from the plurality of bifurcated flow paths, a plurality of pipes, each of the plurality of pipes connected to an outlet of one of the plurality of bifurcated flow paths to the second storage tank, a plurality of switching valves, each of the plurality of switching valves configured to selectively cause one of the plurality of bifurcated flow paths to communicate with a drain flow path from which the liquid is discharged below the second storage tank, and a plurality of filters, each of the plurality of filters located between one of the plurality of switching valves and the outlet of a corresponding one of the plurality of bifurcated flow paths; driving the pump to cause the liquid to circulate among the first storage tank, the tissue model, and the second storage tank; discharging the liquid from the drain flow path via one of the plurality of switching valves of the pipe coupled to the outlet of a predetermined bifurcated flow path; inserting a catheter into the tissue model, and occluding an upstream portion of the predetermined bifurcated flow path that communicates with the drain flow path, with a balloon; and causing a contrast medium or a therapeutic agent to flow from a distal end of the balloon With the procedure simulator and the training method using the same in the abovementioned aspects, it is possible to generate a pressure difference between the bifurcated flow paths by providing switching valves and filter members in the downstream parts on the bifurcated flow paths, and to cause a user to actually realize that the therapeutic agent can be selectively administered to a specific region with the filter member.

DETAILED DESCRIPTION

Set forth below with reference to the accompanying drawings is a detailed description of embodiments of a procedure simulator that is used for training of a procedure using a catheter, and a procedure training method using the same. Note that since embodiments described below are preferred specific examples of the present disclosure, although various technically preferable limitations are given, the scope of the present disclosure is not limited to the embodiments unless otherwise specified in the following descriptions.

First Embodiment

The present embodiment describes a procedure simulator 10 (see FIG. 2) that simulates treatment for liver cancer.

Figure 1:
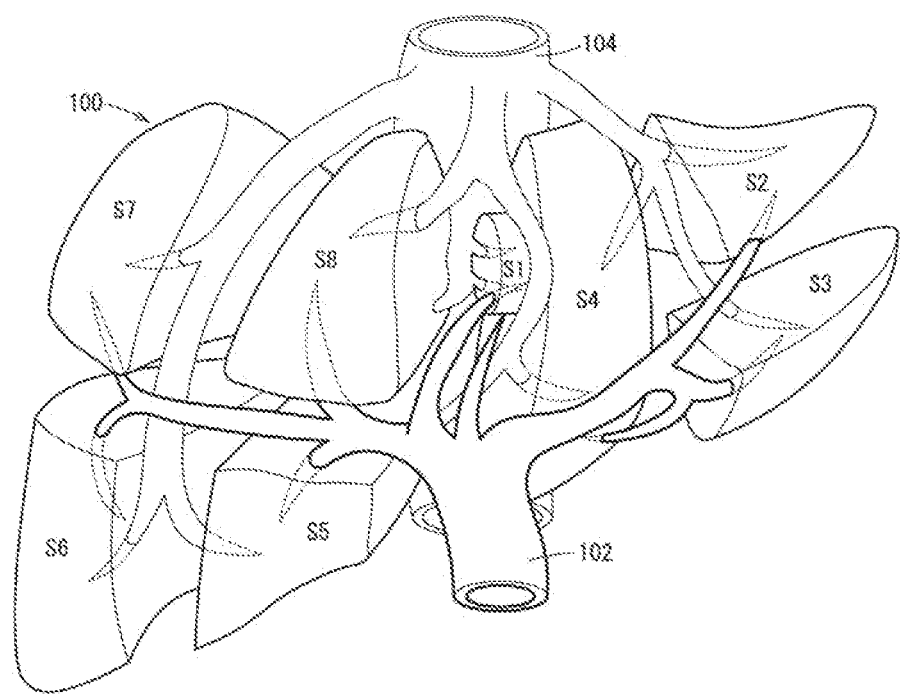
FIG. 1 is a schematic view of a liver.

The liver 100 is the largest organ in an abdominal region of a human being, and ducts such as a hepatic artery 102, a hepatic vein 104, a bile duct, and a portal vein are led to the liver 100, as illustrated in FIG. 1. Note that, in FIG. 1, illustrations of the bile duct and the portal vein are omitted. According to the anatomical classification by Claude Couinaud, the liver 100 is classified into eight subsegments of S1 to S8. In the drawing, S1 is caudate lobe, S2 is a left lateral posterior segment, S3 is a left lateral anterior segment, S4 is a left medial segment, S5 is a right anterior inferior segment, S6 is a right posterior inferior segment, S7 is a right posterior superior segment, and S8 is a right anterior superior segment. Each subsegment is functionally independent, and includes a duct into and out of which blood or the like flows. Accordingly, in the specification and the treatment of a lesion area, it is important to classify the liver into eight subsegments.

In treatment for liver cancer, a procedure in which a catheter 60 (see FIG. 6) is inserted from the hepatic artery 102, and a therapeutic agent is administered selectively to a subsegment in which a cancer tissue is formed, is performed. In the cancer tissue, a large number of minute artery blood vessels are formed. Therefore, in the subsegment where the cancer tissue is present, the blood in the hepatic artery 102 becomes relatively easy to locally flow, thereby generating a local difference (pressure difference) in blood pressure with the hepatic artery 102 in a normal subsegment where no cancer tissue is present. Here, when a predetermined site of the hepatic artery 102 is occluded with a balloon 64 in a distal end portion of the catheter 60, the blood selectively flows toward the cancer tissue due to the pressure difference. By using the flow of the blood, it is possible to perform a procedure of selectively administering a therapeutic agent to a segment where the cancer tissue is present.

Figure 2:
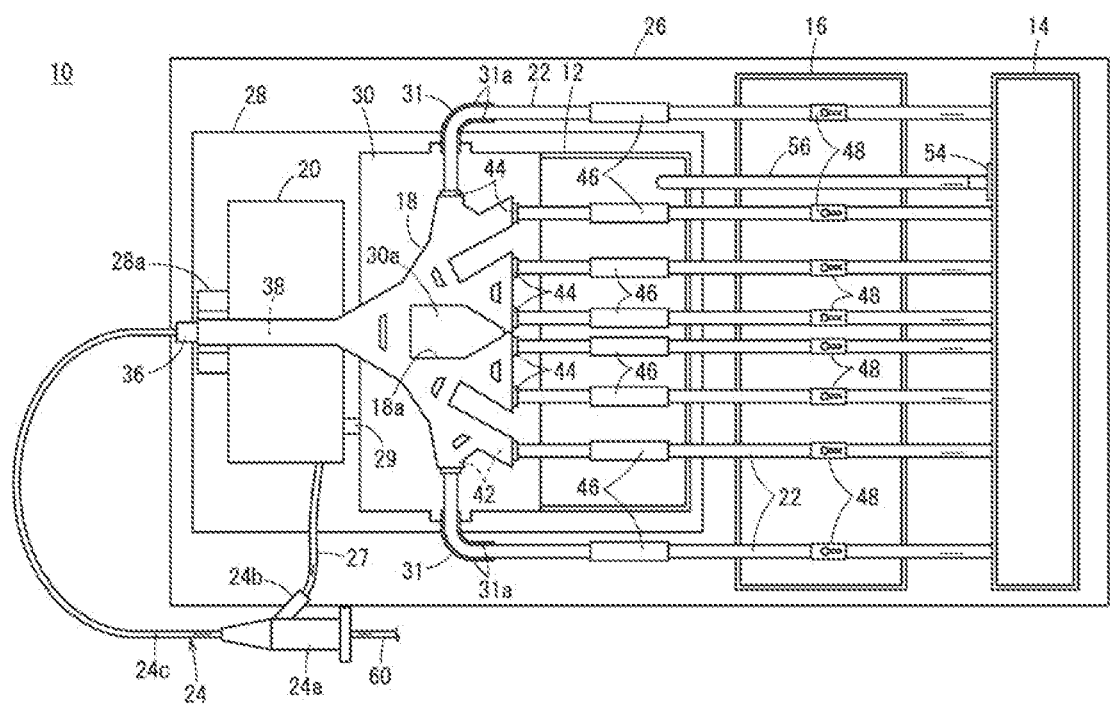
FIG. 2 is a plan view of a procedure simulator according to a first embodiment.

As illustrated in FIG. 2, the procedure simulator 10 according to the embodiment simulates the above-mentioned artery of the liver 100, and includes a tissue model 18 including eight bifurcated flow paths 42 being bifurcated so as to correspond to the eight subsegments in the liver 100. The bifurcated flow paths 42 in the procedure simulator 10 respectively simulate arteries that are connected to the respective subsegments (S1 to S8) in the liver 100, and are used in the training of the cancer treatment using the catheter 60.

The procedure simulator 10 can include a first storage tank 12, a second storage tank 14, a third storage tank 16, the tissue model 18, a pump 20, pipes 22, and a catheter introduction member 24, as illustrated. Among them, the first storage tank 12, the second storage tank 14, the third storage tank 16, the tissue model 18, the pump 20, and the pipes 22 can be disposed (or placed) onto a flat support plate 26. At least each of the first storage tank 12, the second storage tank 14, the third storage tank 16, the tissue model 18, and the pump 20 can be attached onto the support plate 26, which makes it relatively easy to be carried and set or placed.

Figure 3:
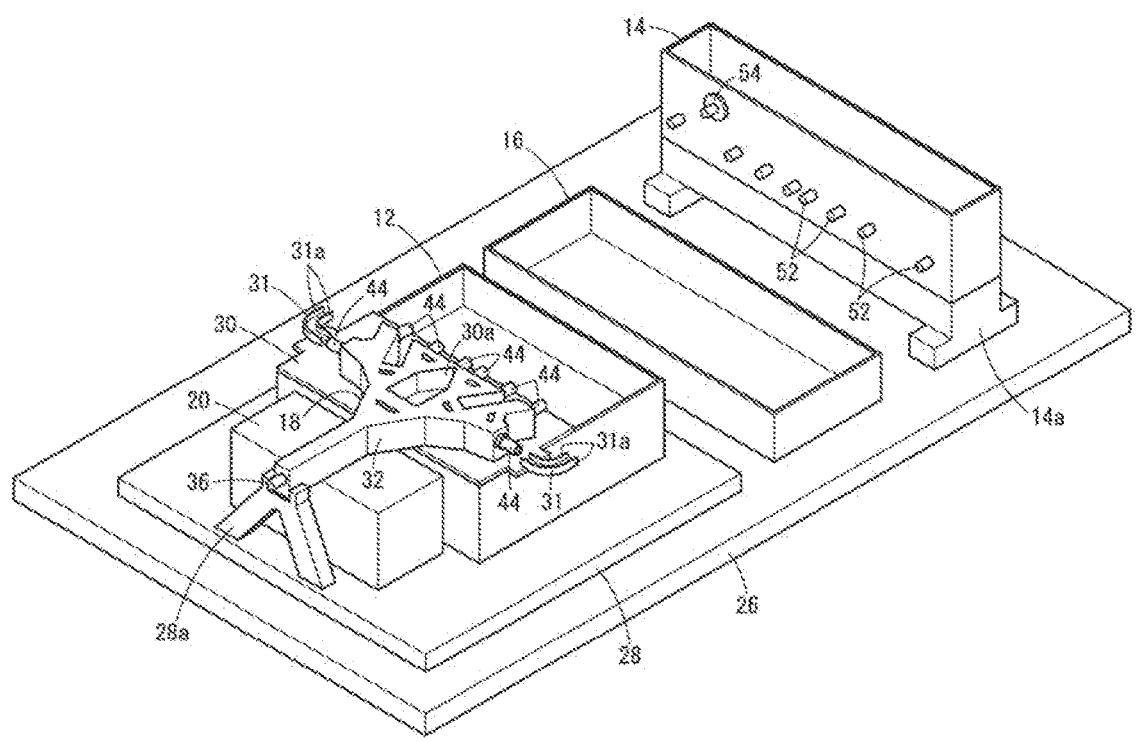
FIG. 3 is a perspective view of the procedure simulator of FIG. 2 in a state where pipes and a catheter introduction member are removed.

As illustrated in FIG. 3, a tray 28 can be mounted on the support plate 26. The tray 28 can be a plate-like member for collectively supporting the first storage tank 12, the tissue model 18, and the pump 20, and includes one end to which the first storage tank 12 is disposed. The tray 28 includes the other end to which a support 28a that supports an upstream portion (a starting end portion 36) of the tissue model 18 is provided. Moreover, the pump 20 is disposed between the support 28a and the first storage tank 12 on the tray 28. The first storage tank 12 is attachable and detachable to and from the tray 28.

The first storage tank 12 can be a container in which a liquid to be introduced into the tissue model 18 is stored, and is formed, for example, in a rectangular shape in a plan view. The first storage tank 12 is disposed under the tissue model 18. The first storage tank 12 can be formed of a resin material such as acrylic resin. The first storage tank 12 may include an opening portion in an upper end of the first storage tank 12.

The pump 20 includes, for example, a centrifugal pump, and pumps up a liquid stored in the first storage tank 12 to the tissue model 18 that is provided above the first storage tank 12. As illustrated in FIG. 2, a suction port of the pump 20 is coupled to the first storage tank 12 via a suction flow path 29. One end of a discharge pipe 27 is coupled to a discharge port of the pump 20. The other end of the discharge pipe 27 is coupled to a liquid supply inlet 24b bifurcated from an introduction port 24a of the catheter introduction member 24.

The catheter introduction member 24 can be provided with a flexible tubular main body portion 24c, and the introduction port 24a provided at a proximal side of the main body portion 24c. A distal side of the main body portion 24c is coupled to the starting end portion 36 of the tissue model 18, and the introduction port 24a and the liquid supply inlet 24b communicate with a flow path 38 of the tissue model 18 through the main body portion 24c. A liquid discharged from the pump 20 is sent into the starting end portion 36 of the tissue model 18 through the catheter introduction member 24.

The introduction port 24a simulates an insertion port from which the catheter 60 is inserted into a blood vessel. The introduction port 24a can be provided with a valve that allows the catheter 60 to be inserted and prevents the liquid in an inside of the catheter introduction member 24 from leaking.

As illustrated in FIG. 3, the tissue model 18 is disposed above the first storage tank 12. The tissue model 18 is attached onto a plate-like support member 30. The support member 30 can be a flat plate-like member that is bridged over so as to cover a part of an upper end opening portion of the first storage tank 12, and is provided with a projection portion 30a to be inserted into an engagement hole 18a of the tissue model 18, on a top face side of support member 30. Pipe guides 31 that guide bent parts of the pipes 22 are respectively provided on both side portions of the support member 30. The pipe guide 31 can be, for example, a U-character shaped groove that can hold the pipe 22 in an inside of the pipe guide 31. The pipe guide 31 can include a pair of side wall portions 31a curved in a circular arc shape in a plan view, and holds the pipe 22 in a state of being curved along the pipe guide 31, between the pair of these side wall portions 31a, thereby preventing the pipe 22 from being occluded. The tissue model 18 includes the engagement hole 18a that is fitted into the projection portion 30a, and is fixed onto the support member 30 in a simplified manner via the pipes 22 held by the pipe guides 31.

Figure 4:
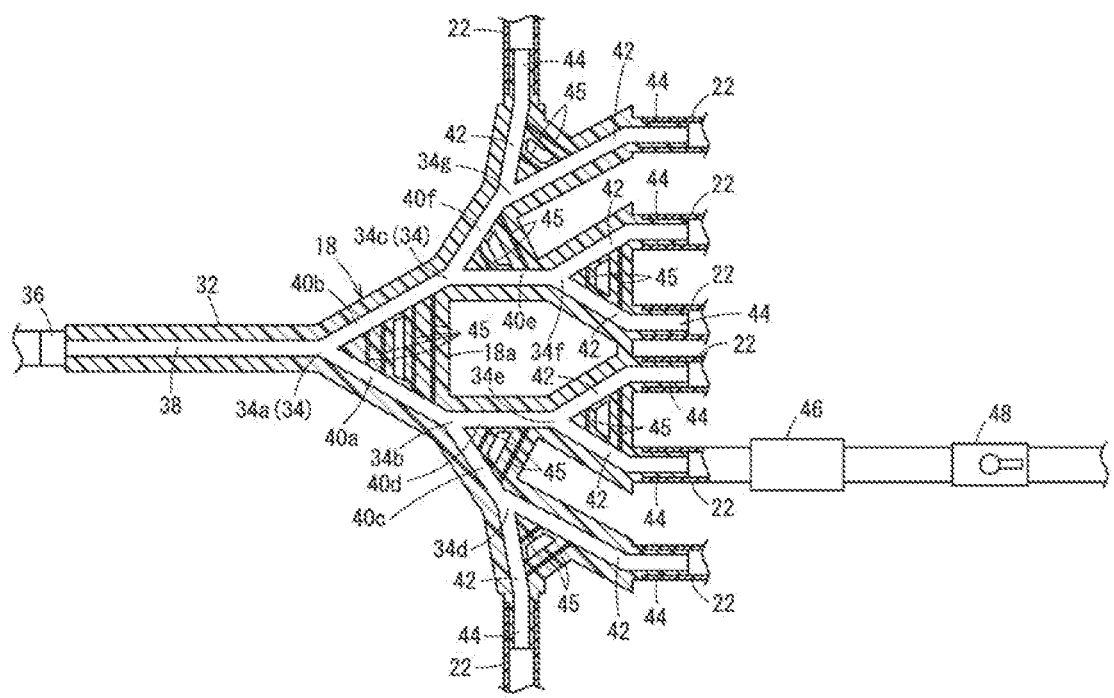
FIG. 4 is a cross-sectional view of a tissue model of the procedure simulator of FIG. 2.

As illustrated in FIG. 4, the tissue model 18 is provided to a flow path formation block 32 that can be made of a transparent material such as acrylic resin. Note that, the tissue model 18 may include a soft material (rubber material) such as silicon resin. The flow path formation block 32 configures the tissue model 18 and includes a plurality of bifurcated portions 34, as illustrated, and eight bifurcated flow paths 42 being bifurcated from the starting end portion 36 at the upstream side toward the downstream side in a shape of a tree diagram. A bifurcated portion 34a is formed in the closest portion to the starting end portion 36, and the flow path 38 is bifurcated into two bifurcated flow paths 40a and 40b in the bifurcated portion 34a. The bifurcated flow paths 40a and 40b being bifurcated at left-right symmetrical angles with respect to the flow path 38 at the upstream side of the bifurcated portion 34a are formed to each have an equal length.

Bifurcated portions 34b and 34c are respectively formed to terminals (ends at the downstream side) of the bifurcated flow paths 40a and 40b. In the bifurcated portion 34b, the bifurcated flow path 40a is bifurcated into two bifurcated flow paths 40c and 40d. The bifurcated flow path 40a is bifurcated into the bifurcated flow paths 40c and 40d at left-right symmetrical angles with respect to a traveling direction of the bifurcated flow path 40a at the upstream side. In the bifurcated portion 34c, the bifurcated flow path 40b is bifurcated into two bifurcated flow paths 40e and 40f. The bifurcated flow path 40b is bifurcated into the bifurcated flow paths 40e and 40f at left-right symmetrical angles with respect to the traveling direction of the bifurcated flow path 40b at the upstream side. The bifurcated flow paths 40c to 40f are formed so as to each have an approximately equal length.

Bifurcated portions 34d to 34g are respectively formed to terminals of the bifurcated flow paths 40c to 40f. In each of the bifurcated portions 34d to 34g, each of the bifurcated flow paths 40c to 40f is further bifurcated into two bifurcated flow paths 42. In other words, the tissue model 18 eventually includes the eight bifurcated flow paths 42 being bifurcated. Each of the bifurcated flow paths 40c to 40f is bifurcated into bifurcated flow paths 42 in left and right directions at the equal angle with respect to each of the bifurcated flow paths 40c to 40f at the upstream side, and the eight bifurcated flow paths 42 are formed so as to each have an approximate same length.

In the tissue model 18, the flow path length from the starting end portion 36 to the terminal of each bifurcated flow path 42 is the same. Moreover, all of the bifurcated portions 34a to 34g and the bifurcated flow paths 40a to 40f and 42 are formed on the same plane. Accordingly, each bifurcated flow path 42 in the tissue model 18 can have an equivalent flow rate. The eight bifurcated flow paths 42 respectively simulate the eight arteries to be connected to the subsegments S1 to S8 in the liver 100 (see FIG. 1).

Moreover, in the tissue model 18, in the downstream of each of the bifurcated portions 34a to 34g, a plurality of interlock flow paths 45 that connect the bifurcated flow paths 40a to 40f and 42 to each other are provided. These interlock flow paths 45 imitate collateral blood flows of a tissue. The bifurcated flow paths 40a to 40f and 42 in the inside of the tissue model 18 are formed such that an inside diameter of the bifurcated paths 40a to 40f becomes smaller, for example, at about 70% to 90% of the inside diameter before the bifurcation for every time each bifurcated flow path passes through each of the bifurcated portions 34a to 34g. The inside diameter after the bifurcation can be, for example, preferably set to about 80% (78% to 82%) of the inside diameter before the bifurcation in order to be closer to a tube tissue of human being. For example, in a case where the inside diameter of the flow path 38 at a side of the starting end portion 36 is set to 5 mm, the inside diameter of each of the bifurcated flow paths 40a and 40b can be set to about 4 mm, and the inside diameter of each of the bifurcated flow paths 40c to 40f can be set to about 3.3 mm. Moreover, the inside diameter of the bifurcated flow path 42 can be set to about 2.8 mm. In addition, the inside diameter of the interlock flow path 45 can be set to about 1.5 mm to 1.8 mm.

As for such the tissue model 18, two resin plates having a thickness about half of that of the tissue model 18 can be prepared, and grooves corresponding to the flow path 38, the bifurcated flow paths 40a to 40f and 42, and the interlock flow paths 45 can be formed in each resin plate. Further, the two resin plates are overlapped and joined to each other such that the grooves correspond to each other, thereby forming the tissue model 18.

Connection ports 44 serving as outlets of the bifurcated flow paths 42 are respectively provided to terminals of the bifurcated flow paths 42. As illustrated in FIG. 2, one ends of the pipes 22 are respectively coupled to the connection ports 44. The eight pipes 22 corresponding to the eight bifurcated flow paths 42 are provided. The pipes 22 extend toward the second storage tank 14, and the other ends of the pipes 22 are respectively coupled to connection ports 52 of the second storage tank 14. Note that, the pipes 22 in both side portions that are largely inclined from the direction toward the second storage tank 14 are respectively guided by the pipe guides 31 and curved to the directions toward the second storage tank 14.

Figure 5:
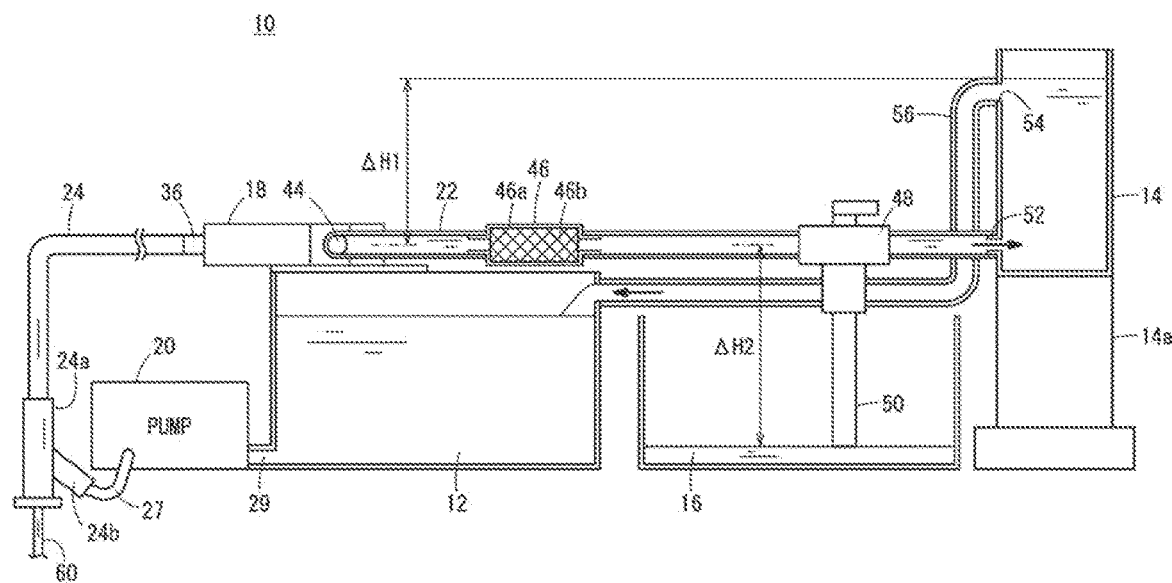
FIG. 5 is a schematic view illustrating a circulation route of a liquid in the procedure simulator of FIG. 2.

A filter member (or filter) 46 and a three-way stopcock 48 are provided to each of the pipes 22. The filter member 46 is provided at the upstream side (in other words, at a side of the tissue model 18 from the three-way stopcock 48) of the three-way stopcock 48, and simulates a cancer cell. The filter members 46 are disposed side by side in a line on the first storage tank 12. As illustrated in FIG. 5, the filter member 46 is provided with a cylindrical casing 46a, and a filter 46b filled in an inside of the casing 46a. In order to allow the discoloration of the filter 46b to be visually identified, the casing 46a can be formed of a raw material such as a transparent resin material with which the inside can be visually identified. The filter 46b can be formed of a white or pale color material, and can be colored when a coloring agent imitating a therapeutic agent or a colored embolic agent is passed through the filter 46b. A user can check that the therapeutic agent has reached a target site by visually identify the coloration of the filter 46b. Moreover, when the embolic agent is flowed into an inside of the casing 46a of the filter member 46, the user can visually identify that the embolic agent is gradually accumulated in the inside of the filter 46b. In addition, when the occlusion of the filter 46b is progressed, the user can visually identify that the inflow velocity of the embolic agent flowing into the filter 46b is lowered. This phenomenon simulates the change in the flow of the liquid similar in a phenomenon in which an embolic agent is accumulated in cancer and tumor tissues in an actual living body. Accordingly, the user can actually check that the therapeutic agent is selectively administered to a specified site. The filter 46b is connected so as to be attachable and detachable to and from the pipe 22. In other words, the filter 46b can also be a disposable member, and in this case, only the filter 46b can be removed from the procedure simulator 10 and discarded.

A drain flow path 50 for discharging a liquid discharged from the bifurcated flow path 42 to a site lower than the tissue model 18 is coupled to the three-way stopcock 48. The three-way stopcock 48 causes the bifurcated flow path 42 to selectively communicate with the second storage tank 14 or the drain flow path 50. When the bifurcated flow path 42 is communicated with the second storage tank 14 by the three-way stopcock 48, the liquid flows into the second storage tank 14 through the pipe 22. Moreover, when the bifurcated flow path 42 is communicated with the drain flow path 50 by the three-way stopcock 48, the liquid discharged from the bifurcated flow path 42 is discharged at a position lower than the tissue model 18 through the drain flow path 50. The three-way stopcock 48 switches the flow path, thereby discharging the liquid from the drain flow path 50. The liquid discharged from the drain flow path 50 is stored in the third storage tank 16.

As illustrated in FIGS. 2 and 3, the second storage tank 14 is a storage tank formed in a rectangular shape in a plan view, and stores in storage tank 14 liquids discharged from the pipes 22. The volumetric capacity of the second storage tank 14 is smaller than the volumetric capacity of the first storage tank 12. As illustrated in FIG. 3, the second storage tank 14 is provided such that a position of a bottom of the second storage tank 14 is in the vicinity of an upper end of the first storage tank 12 with a seating 14a. Note that, the second storage tank 14 is attachable and detachable to and from the support plate 26 or the seating 14a.

Moreover, the second storage tank 14 is provided with the eight connection ports 52 provided in the vicinity of a bottom portion of the second storage tank 14 and one discharge port 54 provided in the vicinity of an upper end of the second storage tank 14. End portions of the pipes 22 at the downstream side are respectively coupled to the eight connection ports 52 that are provided at the same height. An end portion of a reflux pipe 56 at the upstream side is coupled to the discharge port 54.

As illustrated in FIG. 5, an end portion of the reflux pipe 56 at the downstream side is disposed in the inside of the first storage tank 12. In the second storage tank 14, the liquid is stored up to the height of the discharge port 54. When the liquid surface reaches the position of the discharge port 54, the liquid is discharged from the second storage tank 14 via the discharge port 54. The liquid discharged from the discharge port 54 flows in the reflux pipe 56 due to the drop, and flows back to the first storage tank 12.

The third storage tank 16 is a storage tank disposed between the first storage tank 12 and the second storage tank 14, and can be formed in a rectangular shape in a plan view. In an inside of the third storage tank 16, a terminal of the drain flow path 50 is disposed. The liquid discharged from the drain flow path 50 is stored in the third storage tank 16. The third storage tank 16 is formed of, for example, a transparent material such as acrylic resin, and an illumination unit such as a reflection plate or plane-type light-emitting equipment is disposed at a lower surface side of the third storage tank 16, thereby allowing irradiation of illuminating light from a side below the pipes 22 and the filter members 46. Note that, the third storage tank 16 may be fixed so as to be attachable and detachable to and from the support plate 26.

Figure 6:
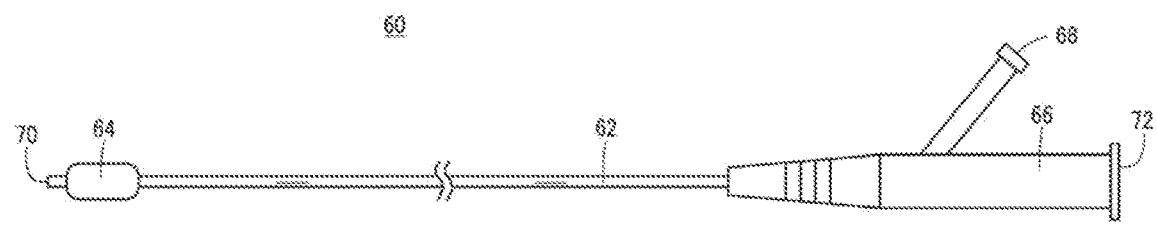
FIG. 6 is a plan view of a catheter that is used for the procedure simulator of FIG. 2.

As illustrated in FIG. 6, the catheter 60 for using in the procedure simulator 10 is provided with a catheter main body 62, the balloon 64 that is provided to a distal end portion of the catheter main body 62 and can inflate and deflate, and a hub 66 that is coupled to a proximal portion of the catheter main body 62. The balloon 64 communicates with an inflation port 68 provided to the hub 66 via an inflation lumen provided to the catheter main body 62. An inflation liquid is injected from the inflation port 68, whereby the balloon 64 inflates. Note that, FIG. 6 illustrates the balloon 64 in an inflated state. The inflation liquid can be injected using a syringe or the like.

The hub 66 includes an injection port 72 from which a therapeutic agent is injected into a blood vessel that extends in a segment serving as a target. The injection port 72 communicates with a terminal opening 70 of the catheter 60 via an injection lumen provided in the inside of the catheter main body 62. The therapeutic agent injected from the injection port 72 is introduced into the blood vessel from the terminal opening 70. Note that, the injection lumen can also function as a guide wire lumen.

Next, the procedure simulator 10 configured as the above acts as follows.

After a user has assembled the procedure simulator 10 as illustrated in FIG. 2, the user puts a liquid in the first storage tank 12. The liquid is preferably transparent so as to cause the user to visually recognize the change in the flow of a colored therapeutic agent or colored water due to a pressure difference, and water (tap water) that can be easily acquired and put away can be used.

Next, after the user has checked that the three-way stopcocks 48 of all the pipes 22 have communicated with the second storage tank 14, the user drives the pump 20. The pump 20 pumps up the liquid in the first storage tank 12, and supplies the liquid to the tissue model 18 through the catheter introduction member 24. The liquid flows in the flow path 38 and the bifurcated flow paths 40a to 40f and 42 of the tissue model 18, and is stored in the second storage tank 14 through the pipes 22. As illustrated in FIG. 5, the liquid in the second storage tank 14 flows back to the first storage tank 12 through the reflux pipe 56. As mentioned above, by the pump 20, the liquid in the first storage tank 12 continuously circulates in a route passing through the catheter introduction member 24, the tissue model 18, the pipes 22, the second storage tank 14, and the reflux pipe 56, and returning to the first storage tank 12.

In the second storage tank 14, the liquid surface of the liquid is kept at a position of the discharge port 54. Accordingly, a water pressure corresponding to a difference ΔH1 between the height of the tissue model 18 and the height of the liquid surface of the second storage tank 14 acts on the bifurcated flow paths 40a to 40f and 42 in the inside of the tissue model 18. In this state, the liquid flows through each bifurcated flow path 42 of the tissue model 18 at the approximately same flow rate, and can simulate flows of the healthy hepatic artery 102 having no cancer tissue.

Next, the user inserts the catheter 60 into the tissue model 18 through the catheter introduction member 24. The user can check a behavior of a simulated therapeutic agent when administering the simulated therapeutic agent from the terminal opening 70 of the catheter 60 in a state where the balloon 64 does not inflate. The user can visually identify the flow of the healthy hepatic artery 102 by injecting colored water being colored as a simulated therapeutic agent.

Figure 7:
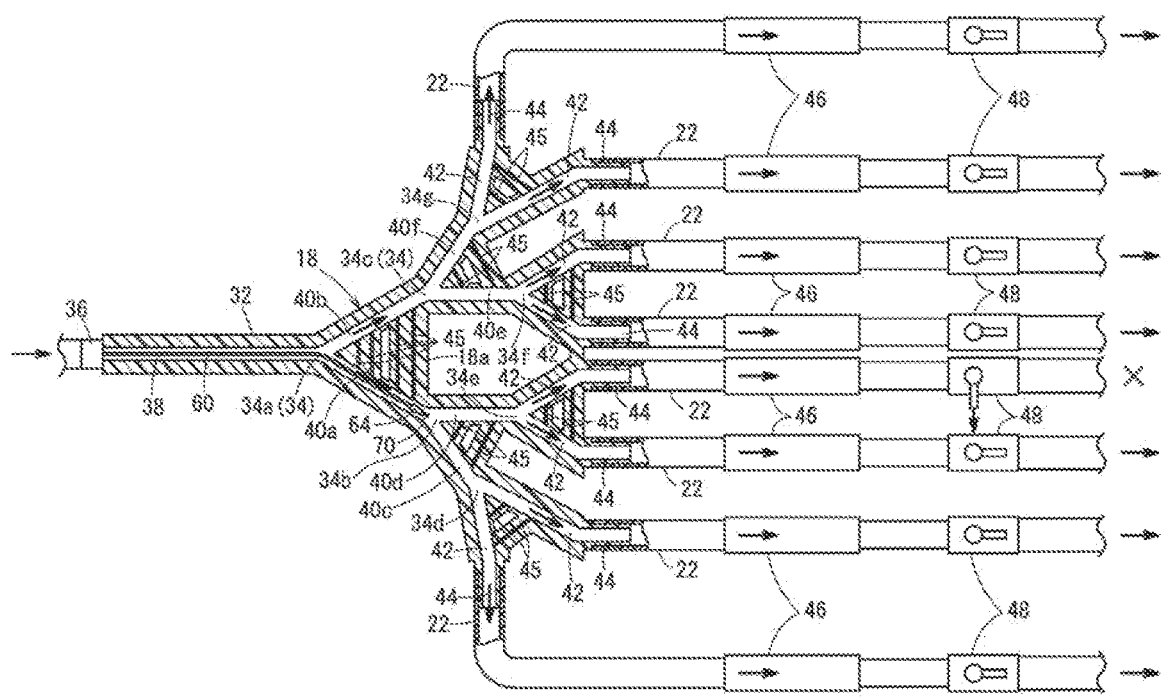
FIG. 7 is an explanation view illustrating a flow of the liquid when a drain flow path is communicated with a predetermined bifurcated flow path in the procedure simulator of FIG. 2.

Thereafter, as illustrated in FIG. 7, the user operates the three-way stopcock 48 of the pipe 22 coupled to the predetermined bifurcated flow path 42, and causes the bifurcated flow path 42 to communicate with the drain flow path 50. Accordingly, the liquid in the predetermined bifurcated flow path 42 is discharged from a terminal portion of the drain flow path 50 that is present at a position lower than that of the tissue model 18. The water pressure of the predetermined bifurcated flow path 42 is decreased by the amount corresponding to a drop ΔH2 between the tissue model 18 and the liquid surface of the third storage tank 16. Accordingly, a pressure difference corresponding to ΔH1+ΔH2 is generated between the bifurcated flow path 42 that communicates with the second storage tank 14 and the bifurcated flow path 42 that communicates with the drain flow path 50. In this manner, the flow of the hepatic artery 102 in a case where a tumor tissue is generated in a predetermined segment can be simulated by causing the bifurcated flow path 42 to communicate with the drain flow path 50.

Next, in a state where the balloon 64 does not inflate, the user injects colored water from the terminal opening 70 of the catheter 60. In the state where the balloon 64 does not inflate, the colored water flows through all of the bifurcated flow paths 42 at the downstream side of the terminal opening 70. The flow of the colored water through all of the bifurcated paths 42 at the downstream side of the terminal opening is because the water pressure sent out by the pump 20 is higher than an internal pressure of the bifurcated flow path 42 that communicates with the drain flow path 50 and an internal pressure of the bifurcated flow path 42 that communicates with the second storage tank 14.

Figure 8:
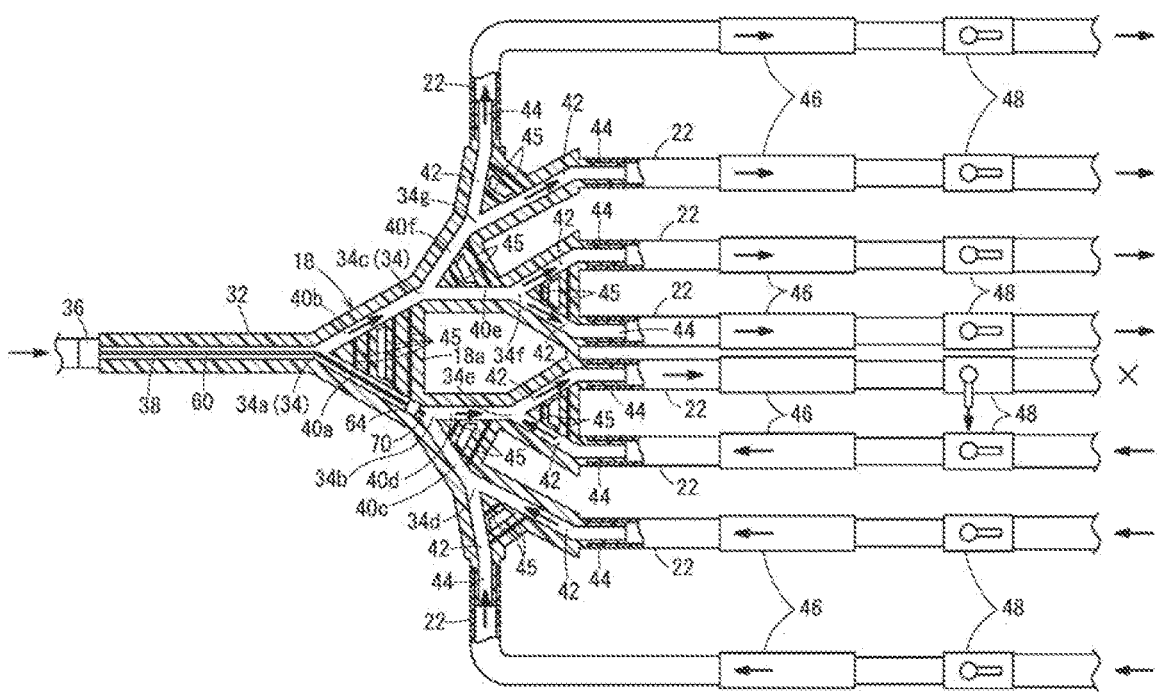
FIG. 8 is an explanation view illustrating the flow of the liquid when an upstream side of the bifurcated flow path is occluded with a balloon, in the operation of the procedure simulator of FIG. 7.

Next, as illustrated in FIG. 8, the user can visually identify the behavior of the simulated therapeutic agent in a case where the bifurcated flow path 40a and the interlock flow path 45 at the upstream side of the bifurcated portion 34b are occluded by inflating the balloon 64 of the catheter 60 at the upstream of the bifurcated portion 34b. In a state where the balloon 64 has inflated, the user injects colored water from the terminal opening 70 of the catheter main body 62. The colored water simulates a contrast medium or a therapeutic agent. Since the bifurcated flow path 40a and the interlock flow paths 45 at the upstream side are occluded with the balloon 64, the bifurcated flow paths 40a, 40c, 40d, and 42 at the downstream side of the balloon 64 receive no pressure by the pump 20.

In this case, the pressure of the bifurcated flow path 42 that communicates with the second storage tank 14 is relatively higher than the pressure of the bifurcated flow path 42 that communicates with the drain flow path 50. Accordingly, the liquid is drawn toward the bifurcated flow path 42 that communicates with the drain flow path 50 from the bifurcated flow path 42 that communicates with the second storage tank 14. In this state, when injecting the colored water from the terminal opening 70 of the catheter main body 62, the user can visually identify a state where the colored water selectively flows into the bifurcated flow path 42 communicated with the drain flow path 50. The liquid in the second storage tank 14 flows back from the bifurcated flow path 42 that communicates with the second storage tank 14, so that it is possible to generate with stability a state where the liquid flows only into the bifurcated flow path 42 that communicates with the drain flow path 50. The state where the liquid flows only into the bifurcated flow path 42 that communicates with the drain flow path 50 can be maintained for a comparatively long period of time until the liquid in the first storage tank 12 becomes empty. Therefore, the user can perform training that includes changing the occluded position of the balloon 64 to various positions, changing the position of the bifurcated flow path 42 that communicates with the drain flow path 50, and the like. Accordingly, the user can develop a better understanding of the behavior of the simulated therapeutic agent.

Moreover, the colored water flowed into the bifurcated flow path 42 that communicates with the drain flow path 50 dyes the filter member 46 when passing through the filter member 46 that simulates a cancer tissue. Accordingly, the user can visually identify that the therapeutic agent has selectively reached the cancer tissue. Moreover, the colored water may include a solid embolization material. As for the solid embolization material, gelatin, spherical plastic (bead), a fluorescent piece, and the like are suitably used. When the user has caused the solid embolization material to flow, the user can check a state where the filter member 46 becomes gradually clogged, and can grasp the change in the flow of the blood when the filter member 46 serving as a simulated tumor tissue has been clogged.

The procedure simulator 10 according to the embodiment exhibits the following effects.

In the embodiment: a liquid is stored in the first storage tank 12, and wherein the liquid imitates blood; the tissue model 18 including the plurality of the bifurcated flow paths 40a to 40f and 42 being bifurcated toward the downstream via the plurality of the bifurcated portions 34a to 34g, the bifurcated portions 34a to 34g and the bifurcated flow paths 40a to 40f and 42 being formed at the same height; the pump 20 that supplies the liquid in the first storage tank 12 to the tissue model 18; the liquid to be flowed out from the bifurcated flow paths 42 is stored in the second storage tank 14; the pipe 22 that connects the outlet of the bifurcated flow path 42 to the second storage tank 14; the three-way stopcock 48 (switching valve) that is provided on a way of the pipe 22 and selectively causes the bifurcated flow paths 42 to communicate with the drain flow path 50 from which the liquid is discharged below the second storage tank 14; and the filter member 46 that is provided on a way of the pipe 22 between the three-way stopcock 48 and the outlet of the bifurcated flow path 42 and includes an inside that can be visually identified, are provided.

With the above-mentioned procedure simulator 10, by operating the three-way stopcock 48 (switching valve), a pressure difference can be generated between the bifurcated flow path 42 communicated with the drain flow path 50 and the bifurcated flow path 42 not communicated with the drain flow path 50, whereby a cancer tissue can be simulated by the filter member 46 provided at the downstream side of the bifurcated flow path 42. Further, by visually identifying the filter member 46, it is possible to cause the user to actually realize that the therapeutic agent can be selectively administered to a specific site.

The abovementioned procedure simulator 10 may be configured such that the pipe 22 is coupled to a vicinity of a lower end of the second storage tank 14, and the liquid surface of the liquid in the second storage tank 14 is maintained at a position higher than the tissue model 18. Accordingly, a pressure corresponding to the difference ΔH1 in height between the liquid surface of the second storage tank 14 and the tissue model 18 acts on the bifurcated flow path 42 that communicates with the second storage tank 14.

In the abovementioned procedure simulator 10, the pipe 22 may be coupled to the second storage tank 14 at the same height as the tissue model 18. With such a configuration, it is possible to make the flow resistance and the pressure that act on each bifurcated flow path 42 in the tissue model 18 uniform.

The abovementioned procedure simulator 10 may be provided with the reflux pipe 56 that is coupled to the second storage tank 14 at a position higher than the pipe 22, and causes the liquid in the second storage tank 14 to flow back to the first storage tank 12. Accordingly, it is possible to prevent the amount of the liquid in the inside of the first storage tank 12 from decreasing with time, so that the user can perform the simulation of the procedure for a longer period of time.

In the abovementioned procedure simulator 10, the filter members 46 provided to the respective bifurcated flow paths 42 are disposed side by side in a line in the downstream side of the tissue model 18. Accordingly, the user can relatively easily visually identify a difference between the filter member 46 in which a tumor is simulated and the other filter members 46.

The abovementioned procedure simulator 10 is provided with the third storage tank 16 that contains the liquid discharged from the drain flow path 50, and the liquid surface of the third storage tank 16 can be set to a position lower than the tissue model 18. Accordingly, it is possible to generate a pressure difference corresponding to the sum of the difference ΔH1 and the drop ΔH2 between the liquid surface of the third storage tank 16 and the tissue model 18, between the bifurcated flow path 42 communicated with the drain flow path 50 and the bifurcated flow path 42 communicated with the second storage tank 14.

In the above-mentioned procedure simulator 10, the second storage tank 14 may be provided at a position separated from the tissue model 18 in a horizontal direction, and the third storage tank 16 may be disposed between the second storage tank 14 and the tissue model 18. Accordingly, it is possible to dispose the third storage tank 16 below the three-way stopcock 48, and simplify the routing of the drain flow path 50.

In the abovementioned procedure simulator 10, the first storage tank 12 may be disposed below the tissue model 18. Accordingly, the tissue model 18 of the procedure simulator 10 is disposed in a compact manner.

In the abovementioned procedure simulator 10, the tissue model 18 and the pipe 22 may be formed of a transparent material. Accordingly, the user can directly visually identify the flow of the colored water, and can relatively easily actually realize that the therapeutic agent can be selectively administered to a specific site.

Moreover, a procedure training method according to the embodiment is a procedure training method that uses the abovementioned procedure simulator 10, and includes: filling a liquid in the first storage tank 12; driving the pump 20 to cause the liquid to circulate among the first storage tank 12, the tissue model 18, and the second storage tank 14; discharging the liquid from the drain flow path 50 via the three-way stopcock 48 (switching valve) of the pipe 22 coupled to an outlet of the predetermined bifurcated flow path 42; inserting the catheter 60 into the tissue model 18 and occluding an upstream portion of the bifurcated flow path 42 that communicates with the drain flow path 50 with the balloon 64; and causing colored water (a contrast medium or a therapeutic agent) to flow from a distal end of the balloon 64.

With the abovementioned procedure training method, it is possible to generate a pressure difference between the bifurcated flow paths 42, and simulate a cancer tissue by the filter member 46. Further, by causing the colored water to flow from the distal end of the balloon 64, it is possible to cause the user to actually realize that the therapeutic agent can be selectively administered to the filter member 46 in which a cancer tissue is imitated.

Second Embodiment

Figure 9:
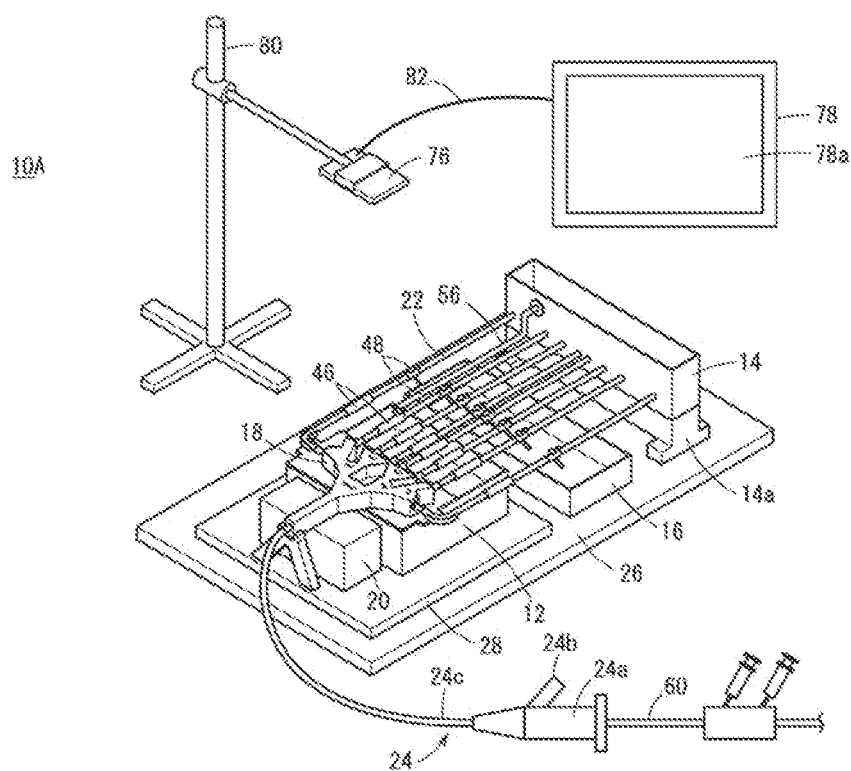
FIG. 9 is a perspective view of a procedure simulator according to a second embodiment.

As illustrated in FIG. 9, a procedure simulator 10A according to the present embodiment includes, in addition to the device configuration illustrated in FIG. 2, an imaging device 76 that images the tissue model 18 and the pipe 22, and a display device 78 that displays video imaged by the imaging device 76.

The imaging device 76 can include, for example, a smartphone, a compact camera, or the like, and is disposed above the tissue model 18 and the pipes 22 with a stand 80. A planar illumination device that illuminates the tissue model 18, the pipes 22, and the filter members 46 may be provided under the third storage tank 16. The imaging device 76 images video of the tissue model 18 and the pipe 22 seen from the upper side. The imaging device 76 is coupled to the display device 78, for example, via a communication cable 82 such as a USB cable, and video data imaged by the imaging device 76 is sent to the display device 78.

The display device 78 can be a device having a comparative large display screen 78a, for example, a liquid crystal monitor, a screen, a tablet terminal, or the like can be used. The image (video) imaged by the imaging device 76 is displayed in real time on the display screen 78a of the display device 78.

The procedure simulator 10A according to the embodiment can be also used for the training of operating the catheter 60 while watching a planar image that appears on the display screen 78a of the display device 78. With such the training, it is possible to grasp the operation of the catheter 60 and the flow of the colored water under the condition similar to the actual procedure that the user performs while watching an X-ray fluoroscope.

In the above, the present disclosure has been described with the preferred embodiments, however, the present disclosure is not limited to the embodiments, and it is needless to say that various modifications are possible without deviating from the scope of the disclosure. Even in a case where a cancer and tumor tissue generated in an organ other than the liver is used as a target, tissue models in accordance with target organs are combined, whereby the present disclosure can be implemented.

The detailed description above describes embodiments of a procedure simulator that is used for training of a procedure using a catheter, and a procedure training method using the same. The invention is not limited, however, to the precise embodiments and variations described. Various changes, modifications and equivalents may occur to one skilled in the art without departing from the spirit and scope of the invention as defined in the accompanying claims. It is expressly intended that all such changes, modifications and equivalents which fall within the scope of the claims are embraced by the claims.

What is claimed is:

1. A procedure simulator comprising:
   a first storage tank configured to store a liquid;
   a tissue model including a plurality of bifurcated flow paths being bifurcated downstream via a plurality of bifurcated portions, the plurality of bifurcated portions and the plurality of bifurcated flow paths being formed at a same height;
   a pump configured to supply the liquid in the first storage tank to the tissue model;
   a second storage tank configured to store the liquid from the plurality of bifurcated flow paths;
   a plurality of pipes, each of the plurality of pipes connecting an outlet of one of the plurality of bifurcated flow paths to the second storage tank;
   a plurality of switching valves, each of the plurality of switching valves configured to selectively cause one of the plurality of bifurcated flow paths to communicate with a drain flow path from which the liquid is discharged below the second storage tank; and
   a plurality of filters, each of the plurality of filters located between one of the plurality of switching valves and the corresponding outlet of the plurality of bifurcated flow paths.

2. The procedure simulator according to claim 1, wherein the plurality of pipes is coupled to a vicinity of a lower end of the second storage tank, and a liquid surface of the liquid in the second storage tank is maintained at a position higher than the tissue model.

3. The procedure simulator according to claim 2, wherein the plurality of pipes is coupled to the second storage tank at a same height as the tissue model.

4. The procedure simulator according to claim 3, further comprising:
   a reflux pipe coupled to the second storage tank at a position higher than the pipe, and the reflux pipe configured to cause the liquid in the second storage tank to flow back to the first storage tank.

5. The procedure simulator according to claim 1, wherein the plurality of filters is provided to the respective bifurcated flow path side by side in a line.

6. The procedure simulator according to claim 1, further comprising:
   a third storage tank configured to contain the liquid to be discharged from the drain flow path, wherein a liquid surface of the third storage tank is present at a position lower than the tissue model.

7. The procedure simulator according to claim 6, wherein the second storage tank is provided at a position separated from the tissue model in a horizontal direction, and the third storage tank is disposed between the second storage tank and the tissue model.

8. The procedure simulator according to claim 1, wherein the first storage tank is disposed below the tissue model.

9. The procedure simulator according to claim 1, further comprising:
   an imaging device configured to image the tissue model and the plurality of pipes; and
   a display device configured to display video imaged by the imaging device.

10. The procedure simulator according to claim 9, further comprising:
    an illumination device configured to illuminate the tissue model, the plurality of pipes, and the plurality of filters.

11. A procedure simulator comprising:
    a tissue model including a plurality of bifurcated flow paths;
    a first storage tank configured to store a liquid;
    a second storage tank configured to store the liquid from the bifurcated flow paths;
    a third storage tank configured to contain the liquid to be discharged from a drain flow path, wherein a liquid surface of the third storage tank is present at a position lower than the tissue model;
    a pump configured to supply the liquid in the first storage tank to the tissue model;
    a plurality of pipes, each of the plurality of pipes configured to connect an outlet of one of the plurality of bifurcated flow paths to the second storage tank;
    a plurality of switching valves, each of the plurality of switching valves configured to selectively cause one of the plurality of bifurcated flow paths to communicate with the drain flow path from which the liquid is discharged below the second storage tank; and
    a plurality of filters, each of the plurality of filters located between one of the plurality of switching valves and a corresponding outlet of one of the plurality of bifurcated flow paths.

12. A training method that uses a procedure simulator, the training method comprising:
    filling a first storage tank of the procedure simulator with a liquid, the procedure simulator including the first storage tank, a tissue model including a plurality of bifurcated flow paths bifurcated downstream via a plurality of bifurcated portions, the plurality of bifurcated portions and the plurality of bifurcated flow paths being at a same height, a pump to supply the liquid in the first storage tank to the tissue model, a second storage tank to store the liquid from the plurality of bifurcated flow paths, a plurality of pipes, each of the plurality of pipes connected to an outlet of one of the plurality of bifurcated flow paths to the second storage tank, a plurality of switching valves, each of the plurality of switching valves configured to selectively cause one of the plurality of bifurcated flow paths to communicate with a drain flow path from which the liquid is discharged below the second storage tank, and a plurality of filters, each of the plurality of filters located between one of the plurality of switching valves and the outlet of a corresponding one of the plurality of bifurcated flow paths;

driving the pump to cause the liquid to circulate among the first storage tank, the tissue model, and the second storage tank;

discharging the liquid from the drain flow path via one of the plurality of switching valves of the pipe coupled to the outlet of a predetermined bifurcated flow path;

inserting a catheter into the tissue model, and occluding an upstream portion of the predetermined bifurcated flow path that communicates with the drain flow path, with a balloon; and causing a contrast medium or a therapeutic agent to flow from a distal end of the balloon.

13. The training method according to claim 12, further comprising:

coupling the plurality of pipes to a vicinity of a lower end of the second storage tank;

maintaining a liquid surface of the liquid in the second storage tank at a position higher than the tissue model; and coupling the plurality of pipes to the second storage tank at a same height as the tissue model.

14. The training method according to claim 13, further comprising:

coupling a reflux pipe to the second storage tank at a position higher than the plurality of pipes; and causing the liquid in the second storage tank to flow back to the first storage tank.

15. The training method according to claim 12, further comprising:

containing the liquid to be discharged from the drain flow path in a third storage tank; and presenting a liquid surface of the third storage tank at a position lower than the tissue model.

16. The training method according to claim 15, further comprising:

providing the second storage tank at a position separate from the tissue model in a horizontal direction; and disposing the third storage tank between the second storage tank and the tissue model.

17. The training method according to claim 12, further comprising:

disposing the first storage tank below the tissue model.

18. The training method according to claim 12, further comprising:

imaging the tissue model and the plurality of pipes with an imaging device;

displaying video images by the imaging device on a display device; and illuminating the tissue model, the plurality of pipes, and the plurality of filters with an illumination device.

* * * * *